United States Patent
Koda et al.

(10) Patent No.: US 7,226,674 B2
(45) Date of Patent: Jun. 5, 2007

(54) MAGNETIC RECORDING MEDIUM, METHOD FOR PRODUCING THE SAME, AND MAGNETIC RECORDING APPARATUS

(75) Inventors: Tetsunori Koda, Moriya (JP); Hideaki Yamanaka, Toride (JP); Enji Fujita, Matsudo (JP); Satoshi Matsunuma, Kamakura (JP)

(73) Assignee: Hitachi Maxell, Ltd., Osaka (JP)

( * ) Notice: Subject to any disclaimer, the term of this patent is extended or adjusted under 35 U.S.C. 154(b) by 430 days.

(21) Appl. No.: 10/765,049

(22) Filed: Jan. 28, 2004

(65) Prior Publication Data

US 2004/0185308 A1 Sep. 23, 2004

(30) Foreign Application Priority Data

Feb. 7, 2003 (JP) ............................. 2003-030905

(51) Int. Cl.
*G11B 5/66* (2006.01)
*G11B 5/70* (2006.01)

(52) U.S. Cl. ................... 428/829; 427/131; 204/192.2

(58) Field of Classification Search ................ 428/829, 428/827, 828, 828.1; 427/131; 204/192.2
See application file for complete search history.

(56) References Cited

U.S. PATENT DOCUMENTS 5,041,922 A * 8/1991 Wood et al. .................. 360/55

2002/0136929 A1 * 9/2002 Oikawa et al. ......... 428/694 TM

FOREIGN PATENT DOCUMENTS

| JP | A 8-83418 | 3/1996 |
| JP | A 2002-83411 | 3/2002 |
| JP | A 2002-208127 | 7/2002 |

OTHER PUBLICATIONS

Oikawa et al., "Microstructure and Magnetic Properties of CoPtCr-SiO$_2$ Perpendicular Recording Media," IEEE Transactions on Magnetics, vol. 38, No. 5, Sep. 2002.

* cited by examiner

*Primary Examiner*—Holly Rickman
(74) *Attorney, Agent, or Firm*—Oliff & Berridge PLC

(57) ABSTRACT

A magnetic recording medium based on the perpendicular magnetic recording system has a substrate which is formed of a non-magnetic material, a soft magnetic back layer which is formed of a soft magnetic material and which is formed on the substrate, an underlayer which is formed on the soft magnetic back layer, and a recording layer which is formed of an alloy magnetic material which is mainly composed of CoPtCr and contains an oxide, and which is formed on the underlayer. The recording layer is formed of two or more magnetic layers having different oxide contents, and the layer, which is included in the two or more magnetic layers for constructing the recording layer and which is provided on a side nearest to the underlayer, has the highest oxide content in the recording layer. The magnetic recording medium has more excellent magnetic characteristics with less medium noise.

13 Claims, 8 Drawing Sheets

MAGNETIC RECORDING MEDIUM, METHOD FOR PRODUCING THE SAME, AND MAGNETIC RECORDING APPARATUS

BACKGROUND OF THE INVENTION

1. Field of the Invention

The present invention relates to a magnetic recording medium, a method for producing the same, and a magnetic recording apparatus. In particular, the present invention relates to a magnetic recording medium based on the perpendicular magnetic recording system preferably usable for the high density recording, a method for producing the same, and a magnetic recording apparatus.

2. Description of the Related Art

In recent years, the information oriented society is remarkably advanced, and it becomes possible to process, for example, not only the character information but also the voice information and the image information at high speeds. One of the apparatuses capable of processing the information as described above at the high speed is a magnetic recording apparatus which is installed, for example, to the computer. At present, the development is advanced in relation to the magnetic recording apparatus in order that a further small size is realized while improving the recording density.

In the typical magnetic recording apparatus, a plurality of magnetic disks are rotatably installed on a spindle. Each of the magnetic disks comprises a substrate and a magnetic film (recording layer) which is formed on the substrate. Information is recorded by forming magnetic domains having specified directions of magnetization in the recording layer.

Conventionally, the direction of magnetization, which is adopted for the recording in the recording layer of the magnetic disk, is the in-plane direction of the recording layer. This system is called "in-plane magnetic recording system". The realization of the high density recording on the magnetic recording medium based on the in-plane magnetic recording system can be achieved by thinning the film thickness of the recording layer, providing fine and minute grain diameters of magnetic crystal grains which constitute the recording layer, and reducing the magnetic interaction between the respective magnetic grains. However, when the magnetic grains are made to be fine and minute and the magnetic interaction between the respective crystal grains is reduced, then a problem has arisen such that the thermal stability of the magnetization of the recorded bits (magnetic marks) is deteriorated.

The perpendicular magnetic recording system has been suggested in order to solve the problem involved in the in-plane magnetic recording system as described above. In this system, a material is used for the recording layer, in which the perpendicular component of the residual magnetization with respect to the film surface is larger than the in-plane component. The direction of magnetization recorded in the recording layer is directed perpendicularly to the substrate. As a result, a magnetostatically stable state is obtained between the adjoining bits, and the recording transition area is sharpened. When a layer (soft magnetic back layer), which is formed of a soft magnetic material, is further added between the recording layer and the substrate, it is possible to steepen the magnetic field applied to the recording layer when information is recorded. As a result, it is possible to record information on the material having high magnetic anisotropy, and it is possible to improve the thermal stability of the magnetization of the bits. Therefore, the recording can be performed at a higher density.

At present, CoPtCr-based alloys are used for the recording layer of the magnetic recording medium based on the in-plane magnetic recording system (such a medium will be hereinafter referred to as "CoPtCr-based alloy medium"). Magnetic recording media, which use the CoPtCr-based alloy for the recording layer, are mainly researched and investigated for the magnetic recording medium based on the perpendicular magnetic recording system as well, in the same manner as in the in-plane magnetic recording system. The CoPtCr-based alloy medium has the following feature. That is, the CoPtCr-based alloy medium forms the two-phase separation structure which is composed of the ferromagnetic crystal grains having a high Co concentration and the non-magnetic crystal grain boundary having a high Cr concentration. The magnetic interaction between the crystal grains is reduced by the non-magnetic crystal grain boundary. Owing to this effect, it is possible to realize the low noise of the medium which is required for the high density recording.

However, in order to respond to the realization of the recording at higher densities, it is required that the magnetic interaction between the crystal grains is further reduced, and the magnetic thermal stability of the bits is simultaneously further enhanced. A method is known for this purpose, in which oxygen is added to the recording layer to oxidize the crystal grain boundary. Such a method is carried out by adding an oxide to a target when the recording layer is formed by means of the sputtering method, or by forming the recording layer in an oxygen gas atmosphere (see, for example, T. Oikawa et al., "Microstructure and Magnetic Properties of CoPtCr—$SiO_2$ Perpendicular Recording Media", IEEE Trans. Magn., vol. 38, pp. 1976–1978, 2002). In the recording layer formed by the method as described above, a structure, in which the magnetic crystal grains of the recording layer are surrounded by the oxide, i.e., a so-called the granular structure, is formed. The magnetic recording medium, which has the recording layer of the granular structure as described above, is called "oxide-containing CoPtCr-based alloy medium".

In the case of the oxide-containing CoPtCr-based alloy medium, the crystal grains can be subjected to the separation by the aid of the oxide. Accordingly, it is unnecessary to effect the phase separation by performing the heating as performed for the CoPtCr-based alloy medium containing no oxide. Therefore, the oxide-containing CoPtCr-based alloy medium has such a feature that the crystal grain growth is controlled more easily and minute crystal grains are formed more easily. Further, T. Oikawa et al., "Microstructure and Magnetic Properties of CoPtCr—$SiO_2$ Perpendicular Recording Media", IEEE Trans. Magn., vol. 38, pp. 1976–1978, 2002 discloses that the S/N ratio (signal-to-noise ratio) is high in the high recording density state, and the thermal stability of the bits can be enhanced, because the magnetic anisotropy of crystals can be improved while reducing the magnetic interaction between the crystal grains in the oxide-containing CoPtCr-based alloy medium as compared with the CoPtCr-based alloy medium containing no oxide.

On the other hand, a magnetic recording medium, which has a recording layer of the granular structure, has been hitherto suggested for the magnetic recording medium based on the in-plane magnetic recording system as well, in order to reduce the medium noise during the high density recording (see, for example, Japanese Patent Application Laid-open No. 2002-208127, pp. 3–5, FIGS. 1 and 2). This patent document discloses that a recording layer, which is formed on an underlayer, is composed of a plurality of magnetic layers containing oxide or the like, and the concentration of the oxide or the like of each of the magnetic layers for constructing the recording layer is changed. In the case of the magnetic recording medium disclosed in Japanese Patent Application Laid-open No. 2002-208127, in order to simultaneously satisfy both of the epitaxial growth of the recording layer and the improvement in the recording and reproduction characteristics, the oxide concentration is increased in the uppermost layer (magnetic layer provided most separately from the underlayer on the side opposite to the underlayer) in the recording layer, and the oxide concentration is decreased in the magnetic layers disposed thereunder. It is intended to realize the low noise by increasing the oxide concentration in the uppermost layer. The oxide concentration is decreased in the magnetic layers disposed thereunder to improve the lattice match between the underlayer and the recording layer thereby so that the epitaxial growth of crystal grains in the recording layer is facilitated. Further, Japanese Patent Application Laid-open No. 2002-208127 discloses that a granular magnetic film, in which Pt and Cr are increased/decreased, is used for the magnetic layer disposed at a lower position in the recording layer in order to facilitate the epitaxial growth of crystal grains in the recording layer.

According to a verifying experiment performed by the present inventors, the following fact has been revealed. That is, the magnetic characteristics are deteriorated when the oxide concentration in the recording layer is further increased to obtain further fine and minute crystal grains in order to realize a higher recording density on an oxide-containing CoPtCr-based alloy medium based on the perpendicular magnetic recording system. Specifically, the magnetization curve was measured in the perpendicular direction (direction of the easy axis of magnetization) with respect to the film surface of the oxide-containing CoPtCr-based alloy medium. As a result, the squareness ratio of the magnetization curve was greatly deteriorated when the oxide concentration in the recording layer was too high. In the case of the magnetic recording medium having a low squareness ratio, magnetic domains (reverse magnetic domains), in which the magnetization is in a direction opposite to the direction of application of the magnetic field in the residual magnetization state, are formed in the recording layer. As a result, when randomly recorded information is reproduced, then the low frequency components of the medium noise are greatly increased, and the bit error rate is deteriorated. Therefore, it is required that the magnetic characteristics of the recording layer are suppressed from the deterioration in order to respond to the demand for the further high density recording on the oxide-containing CoPtCr-based alloy medium based on the perpendicular magnetic recording system.

SUMMARY OF THE INVENTION

The present invention has been made in order to solve the problems as described above, an object of which is to provide a magnetic recording medium based on the perpendicular magnetic recording system which has more excellent magnetic characteristics with low medium noise, a method for producing the same, and a magnetic recording apparatus.

According to a first aspect of the present invention, there is provided a magnetic recording medium based on a perpendicular magnetic recording system, comprising a substrate which is formed of a non-magnetic material; a soft magnetic back layer which is formed of a soft magnetic material and which is formed on the substrate; an underlayer which is formed on the soft magnetic back layer; and a recording layer which is formed of an alloy magnetic material mainly composed of CoPtCr and which is formed on the underlayer, the alloy magnetic material containing an oxide; wherein the recording layer includes two or more magnetic layers having different oxide contents, and a magnetic layer, which is included in the two or more magnetic layers and which is provided on a side nearest to the underlayer, has the highest oxide content in the recording layer.

The magnetic recording medium of the present invention is the CoPtCr-based alloy medium containing the oxide based on the perpendicular magnetic recording system. In the case of the oxide-containing CoPtCr-based alloy medium, the size of the crystal grain contained in the recording layer is affected by the oxide content (hereinafter referred to as "oxide concentration") in the recording layer. The grain diameter of the crystal grain of the recording layer decreases, as the oxide concentration is higher in the recording layer. It is indispensable that the crystal grains are made to be fine and minute in order to realize the low medium noise in the high recording density zone. Therefore, it is favorable that the oxide concentration is high in the recording layer in the high recording density zone. However, as described above, if the oxide concentration becomes too high, a problem arises such that the magnetic characteristics of the recording layer are deteriorated.

Accordingly, in the oxide-containing CoPtCr-based alloy medium based on the perpendicular magnetic recording system of the present invention, the recording layer is composed of a plurality of magnetic layers having different oxide concentrations. The crystal grains are large and the magnetic characteristics are improved in the magnetic layer having the lower oxide concentration. On the other hand, the magnetic characteristics are deteriorated in the magnetic layer having the higher oxide concentration, but the crystal grains are fine and minute. When the recording layer is formed by stacking or laminating the magnetic layer having the low oxide concentration and the magnetic layer having the high oxide concentration as in the magnetic recording medium of the present invention, the deterioration of the magnetic characteristics of the magnetic layer having the high oxide concentration is supplemented by the magnetic characteristics of the magnetic layer having the low oxide concentration. Therefore, the magnetization characteristic of the entire recording layer of the present invention is improved as compared with a case in which the recording layer is formed of only a magnetic layer having a high oxide concentration. As a result, it is possible to suppress the deterioration of the magnetic characteristics by constructing the recording layer with the plurality of magnetic layers having the different oxide concentrations.

Further, in order to realize the low medium noise on the oxide-containing CoPtCr-based alloy medium based on the perpendicular magnetic recording system, it is necessary that the dispersibility of the crystal grains is reduced (orientation of the crystal grains is improved) and the crystal grains in the recording layer are made as minute as possible within a range in which the magnetic characteristics of the crystal grains are not deteriorated. For this purpose, the crystallinity of the magnetic film formed at the initial stage is important when the recording layer is formed on the underlayer. It is necessary to form more minute cores for the crystal growth for the magnetic film to be formed at the initial stage.

In view of the above, the oxide-containing CoPtCr-based alloy medium based on the perpendicular magnetic recording system of the present invention is formed so that the magnetic layer (hereinafter referred to as "lowermost layer" as well), which is included in the plurality of magnetic layers for forming the recording layer and which is formed on the side nearest to the underlayer, has the highest oxide concentration in the recording layer. When the oxide concentration of the lowermost layer is highest, then the crystal grains of the lowermost layer of the recording layer are made to be most minute in the recording layer, and the minute crystal grains are used as cores for the crystal growth. Therefore, even when the magnetic layer which has the oxide concentration lower than the oxide concentration of the lowermost layer, i.e., the magnetic layer in which the crystal grains have grain diameters larger than those of the crystal grains of the lowermost layer is stacked on the lowermost layer, the crystal grains in the magnetic layer are grown on the minute crystal grains of the lowermost layer. Therefore, the magnetic layer, which is excellent in crystalline orientation, is formed. As a result, the film, which is sufficiently excellent in crystalline orientation, is formed as the entire recording layer. When a plurality of magnetic layers are formed on the lowermost layer in the recording layer, it is possible to arbitrarily set the magnitude correlation between the oxide concentrations of the magnetic layers.

Taking the foregoing fact into consideration, in the magnetic recording medium based on the perpendicular magnetic recording system of the present invention, the recording layer is formed of the two or more magnetic layers having the different oxide concentrations, and the magnetic layer, which is included in the magnetic layers and which is disposed nearest to the underlayer, is allowed to have the highest oxide concentration. Thus, it is possible to simultaneously satisfy both of the improvement of the magnetic characteristics and the realization of the low medium noise.

A further detailed explanation will now be made about the structure of the recording layer of the oxide-containing CoPtCr-based alloy medium based on the perpendicular magnetic recording system of the present invention while making comparison with the magnetic recording medium based on the in-plane magnetic recording system as disclosed in Japanese Patent Application Laid-open No. 2002-208127 described above.

Similarly to the oxide-containing CoPtCr-based alloy medium based on the perpendicular magnetic recording system of the present invention, the magnetic recording medium based on the in-plane magnetic recording system disclosed in Japanese Patent Application Laid-open No. 2002-208127 also has a recording layer which is formed of a plurality of magnetic layers having different oxide concentrations or the like. Further, the recording layer has the granular structure in the same manner as the magnetic recording medium of the present invention. The crystalline structure of CoPtCr, which is used for each of the recording layers having the granular structure of the magnetic recording media of the present invention and Japanese Patent Application Laid-open No. 2002-208127, is the hexagonal closest-packed structure (hereinafter referred to as "hcp structure"), and the easy axis of magnetization thereof is the c-axis. Therefore, in the case of the magnetic recording medium based on the in-plane magnetic recording system as disclosed in Japanese Patent Application Laid-open No. 2002-208127, it is necessary that the c-axis of the recording layer is oriented in the in-plane direction of the recording layer. In the case of the magnetic recording medium based on the perpendicular magnetic recording system as in the present invention, it is necessary that the c-axis of the recording layer is oriented perpendicularly to the in-plane direction of the recording layer.

In general, when a thin film having the hcp structure is formed, the preferential orientation direction is the (001) plane as the closest-packed plane. Therefore, the easy axis of magnetization (c-axis) of the thin film of the hcp structure is preferentially oriented in the direction perpendicular to the film surface. Therefore, in order to improve the crystalline orientation by orienting the c-axis in the in-plane direction in the recording layer of the magnetic recording medium based on the in-plane magnetic recording system, it is necessary that the epitaxial growth of the recording layer is facilitated so that the recording layer is subjected to the (10•0) plane orientation on the (211) plane of the Cr-based alloy as the underlayer for the recording layer. Accordingly, in the case of the magnetic recording medium based on the in-plane magnetic recording system disclosed in Japanese Patent Application Laid-open No. 2002-208127, the epitaxial growth of the recording layer is facilitated by lowering the oxide concentration of the lower layer of the plurality of magnetic layers for constructing the recording layer as described above. Further, in the magnetic recording medium based on the in-plane magnetic recording system disclosed in Japanese Patent Application Laid-open No. 2002-208127, it is intended that the crystal grains are made fine and minute by increasing the oxide concentration of the uppermost layer of the recording layer so that the recording and reproduction characteristics are improved. That is, in the magnetic recording medium based on the in-plane magnetic recording system disclosed in Japanese Patent Application Laid-open No. 2002-208127, the oxide concentration of the lower layer is made to be lower than the oxide concentration of the uppermost layer included in the plurality of magnetic layers for constructing the recording layer, and thus it is intended to simultaneously satisfy the improvement of the magnetic characteristics of the magnetic recording medium and the realization of the low medium noise. It is noted that nothing is disclosed in relation to the magnetic recording medium based on the perpendicular magnetic recording system in Japanese Patent Application Laid-open No. 2002-208127.

On the other hand, as described above, in the case of the magnetic recording medium based on the perpendicular magnetic recording system of the present invention, the (001) plane, which is preferentially oriented when the thin film having the hcp structure is formed, is coincident with the necessary orientation plane (c-axis) of the recording layer. Therefore, the perpendicular magnetic recording system is more advantageous than the in-plane magnetic recording system in view of the crystal growth which occurs when the recording layer is formed. Therefore, in order to simultaneously satisfy both of the improvement of the magnetic characteristics and the realization of the low medium noise on the magnetic recording medium based on the perpendicular magnetic recording system, it is more important to pay the attention to the relationship between the characteristics and the crystal grain diameter (oxide concentration) in the recording layer rather than to pay the attention to the crystal growth in the recording layer. The present inventors have performed a verifying experiment by manufacturing various magnetic recording media based on the perpendicular magnetic recording system having recording layers composed of two or more magnetic layers having different oxide concentrations. As a result, it has been revealed that any difference appears in the recording and reproduction characteristics in the high density recording zone depending on the relationship of the degree of the oxide concentration between the magnetic layers in the recording layer. Specifically, it has been revealed that the recording and reproduction characteristics are more excellent in the case of the magnetic recording medium in which the oxide concentration of the lowermost layer of the recording layer is higher than the oxide concentration of the magnetic layer formed thereon, as compared with the magnetic recording medium which has the relationship of the oxide concentration reverse to the above, probably for the following reason. That is, it is considered that the crystal grain diameters in the lowermost layer are most minute when the oxide concentration of the lowermost layer of the recording layer is higher than the oxide concentration of the magnetic layer formed thereon. Further, it is considered that the crystalline orientation of the entire recording layer is improved owing to the growth of the crystal grains of the magnetic layer stacked on the lowermost layer by using the crystal grains as the cores for the crystal growth.

In the magnetic recording medium of the present invention, it is preferable that the two or more magnetic layers are stacked in such an order that those having higher oxide contents are disposed on a side nearer to the underlayer. The size of the crystal grain in the magnetic layer for constructing the recording layer is more decreased at positions nearer to the magnetic layer disposed on the side of the underlayer in the magnetic recording medium as described above.

In the magnetic recording medium of the present invention, it is preferable that the recording layer is provided in contact with the underlayer.

In the magnetic recording medium of the present invention, it is preferable that the oxide contents of the two or more magnetic layers are 5 to 20 mol %, respectively.

In the magnetic recording medium of the present invention, it is preferable that the recording layer includes a first recording layer and a second recording layer, the first recording layer is arranged on a side of the underlayer, and the following relationship is established between an oxide content A1 in the first recording layer and an oxide content A2 in the second recording layer:

$$5 \text{ mol \%} \leq A2 < 12 \text{ mol \%} \leq A1 \leq 20 \text{ mol \%}.$$

When the oxide concentration in the recording layer formed of the CoPtCr alloy material is not less than 5 mol %, then the separation between the magnetic grains is facilitated, the magnetic interaction between the magnetic grains is more reduced, and the medium noise is reduced as well. However, when the oxide concentration in the recording layer is not less than 12 mol %, then the crystal grain diameters in the recording layer become too small, and the magnetic characteristics are deteriorated. Further, when the oxide concentration in the recording layer exceeds 20 mol %, then oxygen is incorporated into the magnetic crystal grains, the magnetic characteristics are extremely deteriorated, and the magnetic characteristics, which are required for the recording layer, are hardly exhibited.

Therefore, for example, when the recording layer is formed by the two magnetic layers (first and second recording layers) having the different oxide concentrations on the underlayer, and the first recording layer is arranged on the side of the underlayer, then it is preferable to manufacture the magnetic recording medium so that the following relationship holds between the oxide concentration A1 of the first recording layer and the oxide concentration A2 of the second recording layer:

$$5 \text{ mol \%} \leq A2 < 12 \text{ mol \%} \leq A1 \leq 20 \text{ mol \%}.$$

The oxide concentration A1 of the first recording layer is within the range of 12 mol % $\leq A1 \leq$ 20 mol %. Therefore, the grain diameters of the crystal grains in the first recording layer can be made fine and minute, although the magnetic characteristics of the first recording layer are deteriorated. On the other hand, the oxide concentration A2 of the second recording layer is within the range of 5 mol % $\leq A2 <$ 12 mol %. Therefore, it is possible to obtain sufficiently excellent magnetic characteristics, although the crystal grains are larger than those in the first recording layer. When the second recording layer is formed on the first recording layer, the crystal grains in the second recording layer are subjected to the crystal growth by using the minute crystal grains in the first recording layer as the cores for the crystal growth. Therefore, the crystalline orientation is improved, and it is possible to realize the low medium noise. Further, when the second recording layer is formed on the first recording layer, the deterioration of the magnetic characteristics of the first recording layer is supplemented by the magnetic characteristics of the second recording layer. Therefore, when the magnetic recording medium is manufactured so that the relationship as described above is established between the oxide concentration A1 of the first recording layer and the oxide concentration A2 of the second recording layer, it is possible to suppress the deterioration of the magnetic characteristics as well while realizing the low medium noise.

In the magnetic recording medium of the present invention, it is preferable that the oxide contained in the recording layer is an Si oxide. Further, it is also allowable that an Mg oxide is used for the oxide contained in the recording layer other than the Si oxide. However, the minute crystal grains can be obtained with ease when the Si oxide is used as compared with when the Mg oxide is used. Therefore, the Si oxide is especially preferred as the oxide to be contained in the recording layer.

The recording layer of the oxide-containing CoPtCr-based alloy medium is formed by using a mixed gas of argon and oxygen as the sputtering gas. When the mixing ratio is appropriately regulated, the oxide can be introduced in a dispersed state at a desired oxide concentration into the recording layer. When argon is used for the sputtering gas and the amount of oxide contained in the target is regulated, it is also possible to change the oxide concentration in the recording layer of the CoPtCr-based alloy medium. For example, it is possible to use a target in which $SiO_2$ or MgO is mixed at 5 to 20 mol % in the CoPtCr target. When this method is used, it is easy to adjust the oxide concentration. A structure is obtained in the formed recording layer, in which the magnetic crystal grains of the CoPtCr-based alloy are surrounded by $SiO_2$ or MgO as the oxide.

In the magnetic recording medium of the present invention, it is preferable that the recording layer has a thickness of 8 to 20 nm. In order to record information at a high resolution, it is preferable that the recording is performed at a magnetic field portion at which the gradient of the recording magnetic field applied to the recording layer is steep. If the film thickness of the recording layer is too thick, then the recording is also performed at magnetic field portions at which the gradient of the recording magnetic field is not so steep, and it is feared that the resolution may be deteriorated. Therefore, it is preferable that the recording layer is thin to some extent. Specifically, it is preferable that the recording layer is not more than 20 nm. On the other hand, if the film thickness of the recording layer is too thin, the recording magnetic domain becomes magnetically unstable, and the magnetic characteristics necessary as a medium cannot be obtained. Therefore, it is preferable that the recording layer is not less than 8 nm.

In the magnetic recording medium of the present invention, it is preferable that an alloy mainly composed of CoCrRu is used as a material for forming the underlayer. When the underlayer is formed by using the alloy mainly composed of CoCrRu, the crystallinity of the recording layer formed on the underlayer is further improved. As a result, it is possible to obtain higher magnetic characteristics.

In the magnetic recording medium of the present invention, the soft magnetic back layer has a role for converging the magnetic flux leaked from a magnetic head onto the recording layer when information is recorded/reproduced on the recording layer by using the magnetic head. As for the material for forming the soft magnetic back layer, it is preferable to use a soft magnetic material which has a large saturation magnetization, which has a small coercivity, and which has a high magnetic permeability. For example, it is preferable to use a CoTaZr film. Further, it is preferable that the film thickness of the soft magnetic back layer is within a range of 50 to 500 nm.

According to a second aspect of the present invention, there is provided a method for producing a magnetic recording medium, comprising the steps of: forming a soft magnetic back layer on a substrate; forming an underlayer on the soft magnetic back layer; and forming a recording layer on the underlayer with an alloy magnetic material which is mainly composed of CoPtCr and contains an oxide; wherein the step of forming the recording layer includes forming the recording layer by two or more magnetic layers having different oxide contents, and the recording layer is formed so that a magnetic layer, which is included in the two or more magnetic layers and which is formed on a side nearest to the underlayer, has the highest oxide content in the recording layer.

In the method for producing the magnetic recording medium of the present invention, it is preferable that the two or more magnetic layers are stacked in the step of forming the recording layer in such an order that those having higher oxide contents are disposed on a side nearer to the underlayer.

In the method for producing the magnetic recording medium of the present invention, it is preferable that the recording layer is formed by a sputtering method in the step of forming the recording layer.

In the method for producing the magnetic recording medium of the present invention, it is preferable that the two or more magnetic layers having the different oxide contents are formed by an RF sputtering method and a DC sputtering method with sputtering targets having an identical composition in the step of forming the recording layer.

In the method for producing the magnetic recording medium of the present invention, it is preferable that the recording layer is formed by stacking a first recording layer and a second recording layer in this order on the underlayer by the sputtering method in the step of forming the recording layer, and in this process, it is preferable that the sputtering targets having the identical composition are used to form the first recording layer by the RF sputtering method and form the second recording layer by the DC sputtering method.

According to a verifying experiment performed by the present inventors, it has been found out that the oxide concentration in the magnetic layer can be changed by changing the sputtering method even when the sputtering targets having the identical composition are used when the recording layer, which is composed of the plurality of magnetic layers having the different oxide concentrations, is formed by means of the sputtering method. Specifically, the following fact was revealed. That is, when a magnetic layer containing the oxide was formed by means of the RF sputtering method by using a target having a predetermined composition, the oxide concentration in the magnetic layer was the same as that of the target. On the contrary, when a magnetic layer was formed by means of the DC sputtering method by using a target having the same composition as that described above, the oxide concentration in the magnetic layer was lower than the oxide concentration of the target, probably for the following reason. That is, it is considered that the conductive portion (metal portion) included in the target is preferentially subjected to the sputtering when the DC sputtering method is used as compared with when the RF sputtering method is used.

Therefore, for example, it is assumed that the recording layer is formed of the two magnetic layers (first and second recording layers) and the first recording layer is formed on the side of the underlayer. On this assumption, when the first recording layer is formed by means of the RF sputtering method and the second recording layer is formed by means of the DC sputtering method, then the oxide concentration of the first recording layer is higher than the oxide concentration of the second recording layer. Thus, the magnetic recording medium of the present invention as defined in the first aspect is obtained. When the production method as described above is used, it is possible to decrease the number of sputtering targets having different oxide concentrations to be prepared.

According to a third aspect of the present invention, there is provided a magnetic recording apparatus for recording and reproducing information on a magnetic recording medium, comprising the magnetic recording medium as defined in claim 1, a magnetic head which forms a magnetic circuit in cooperation with the recording layer and the soft magnetic back layer of the magnetic recording medium when the information is recorded on the magnetic recording medium, and a drive unit which drives the magnetic head relative to the magnetic recording medium.

According to the magnetic recording medium of the present invention and the method for producing the same, the recording layer, which is formed of the alloy magnetic material mainly composed of CoPtCr containing the oxide, is formed on the underlayer. Further, the recording layer is formed by using the two or more magnetic layers having the different oxide contents, and the recording layer is formed so that the oxide concentration is increased at positions nearer to the underlayer. Therefore, it is possible to provide the magnetic recording medium based on the perpendicular magnetic recording system which has the high magnetostatic characteristics as described above and which is capable of high density recording with the low medium noise, and the method for producing the same.

BRIEF DESCRIPTION OF THE DRAWINGS

FIG. 4 shows a schematic view illustrating a magnetic recording apparatus provided with the magnetic disks manufactured in Example 1, wherein

DESCRIPTION OF THE PREFERRED EMBODIMENTS

The magnetic recording medium, the method for producing the same, and the magnetic recording apparatus of the present invention will be specifically explained below as exemplified by Examples. However, the present invention is not limited thereto.

EXAMPLE 1

Figure 1:
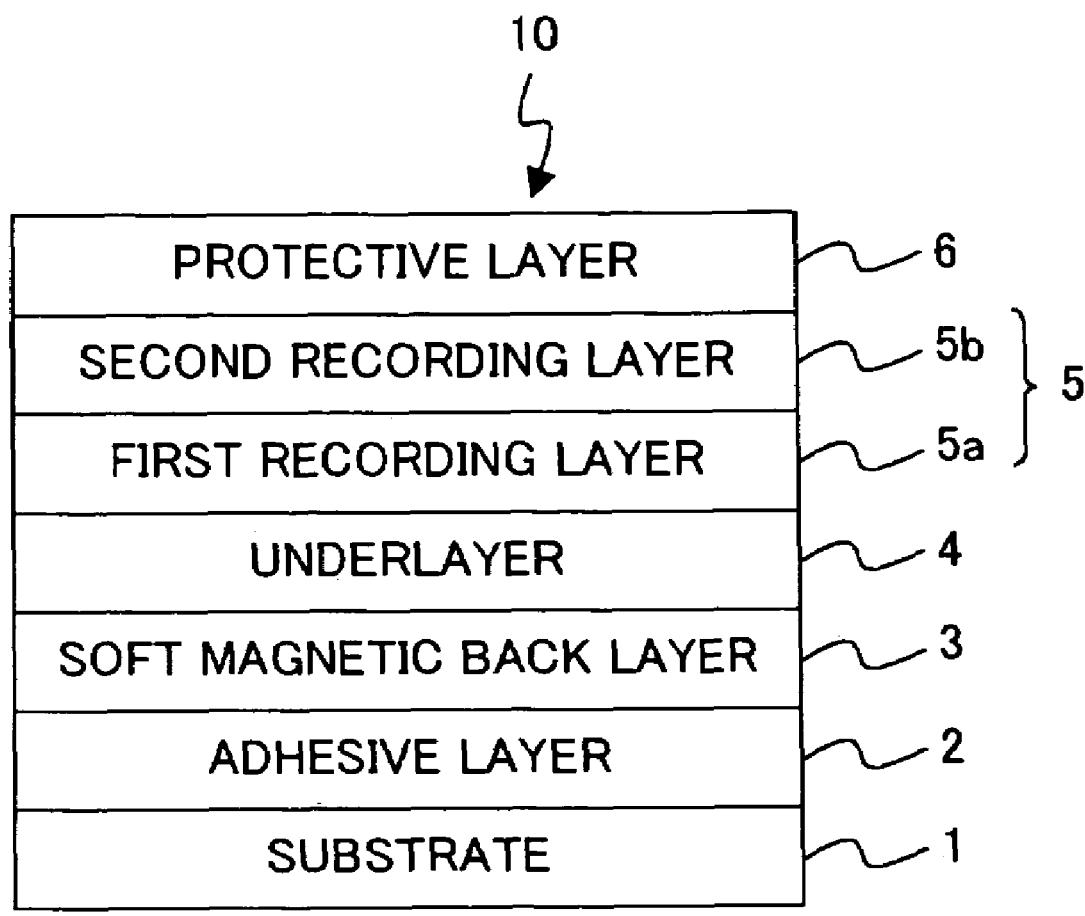
FIG. 1 shows a schematic sectional view illustrating a magnetic disk manufactured in Example 1.

FIG. 1 shows a schematic sectional view illustrating a magnetic disk manufactured in Example 1. As shown in FIG. 1, the magnetic disk 10 manufactured in Example 1 has such a structure that an adhesive layer 2, a soft magnetic back layer 3, an underlayer 4, a first recording layer 5a, a second recording layer 5b, and a protective layer 6 are successively stacked on a substrate 1. In Example 1, a two-layered structure was formed by the first recording layer 5a and the second recording layer 5b to construct a recording layer 5.

The adhesive layer 2 is a layer provided to avoid any exfoliation between the substrate 1 and the film stacked or laminated thereon. The soft magnetic back layer 3 is a layer provided to converge the magnetic field applied to the recording layer when information is recorded. The underlayer 4 is a layer provided to improve the crystalline orientation of the first recording layer 5a and the second recording layer 5b. The first recording layer 5a and the second recording layer 5b are layers on which information is recorded as magnetization information. The direction of magnetization of each of the first recording layer 5a and the second recording layer 5b is perpendicular to the film surface. That is, the magnetic disk of Example 1 is a magnetic disk based on the perpendicular magnetic recording system. The protective layer 6 is a layer provided to protect the layers 2 to 5 successively stacked on the substrate 1. An explanation will be made below about a method for manufacturing the magnetic disk 10 prepared in Example 1.

A disk-shaped glass substrate having a diameter of 2.5 inches (6.5 cm) was used for the substrate 1. A Ti film was formed as the adhesive layer 2 on the substrate 1 by means of the DC sputtering. As for the sputtering condition, the gas pressure was 0.28 Pa and the input electric power was 500 W. Ti was used for the target. The film thickness of the adhesive layer 2 was 5 nm.

Subsequently, a CoTaZr film was formed as the soft magnetic back layer 3 on the adhesive layer 2 by means of the DC sputtering. As for the sputtering condition, the gas pressure was 0.28 Pa and the input electric power was 400 W. The composition of the target was $Co_{88}Ta_{10}Zr_2$ (at. %). The film thickness of the soft magnetic back layer 3 was 200 nm.

Subsequently, a CoCrRu film was formed as the underlayer 4 on the soft magnetic back layer 3 by means of the DC sputtering. As for the sputtering condition, the gas pressure was 4.2 Pa and the input electric power was 500 W. The composition of the target was $Co_{55}Cr_{25}Ru_{20}$ (at. %). The film thickness of the underlayer 4 was 20 nm.

Further, a $CoPtCr—SiO_2$ alloy magnetic film was formed as the first recording layer 5a on the underlayer 4 by means of the RF sputtering. As for the sputtering condition, the gas pressure was 4.2 Pa and the input electric power was 400 W. The composition of the target was $Co_{70}Pt_{20}Cr_{10}$ (at. %)-$SiO_2$ ($CoPtCr:SiO_2$=88:12 mol %). The film thickness of the first recording layer 5a was 5 nm.

Subsequently, a $CoPtCr—SiO_2$ alloy magnetic film was formed as the second recording layer 5b on the first recording layer 5a by means of the RF sputtering. As for the sputtering condition, the gas pressure was 4.2 Pa and the input electric power was 400 W. The composition of the target was $Co_{70}Pt_{20}Cr_{10}$ (at. %)-$SiO_2$ ($CoPtCr:SiO_2$=95:5 mol %). The film thickness of the second recording layer 5b was 10 nm.

Finally, an amorphous carbon film was formed as the protective layer 6 on the second recording layer 5b by means of the DC sputtering. As for the sputtering condition, the gas pressure was 0.20 Pa and the input electric power was 300 W. The film thickness of the protective layer 6 was 3 nm.

COMPARATIVE EXAMPLE 1

A magnetic disk of Comparative Example 1 was prepared as follows. That is, a first recording layer 5a was formed by using a target having a composition of $Co_{70}Pt_{20}Cr_{10}$ (at. %)-$SiO_2$ ($CoPtCr:SiO_2$=95:5mol %), and a second recording layer 5b was formed by using a target having a composition of $Co_{70}Pt_{20}Cr_{10}$ (at. %)-$SiO_2$ ($CoPtCr:SiO_2$=88:12 mol %). The film thickness of the first recording layer 5a was 10 nm, and the film thickness of the second recording layer 5b was 5 nm. That is, in the case of the magnetic disk of Comparative Example 1, the oxide concentration of the first recording layer 5a was smaller than the oxide concentration of the second recording layer 5b. The magnetic disk was manufactured in the same manner as in Example 1 except for the above.

COMPARATIVE EXAMPLE 2

Figure 2:
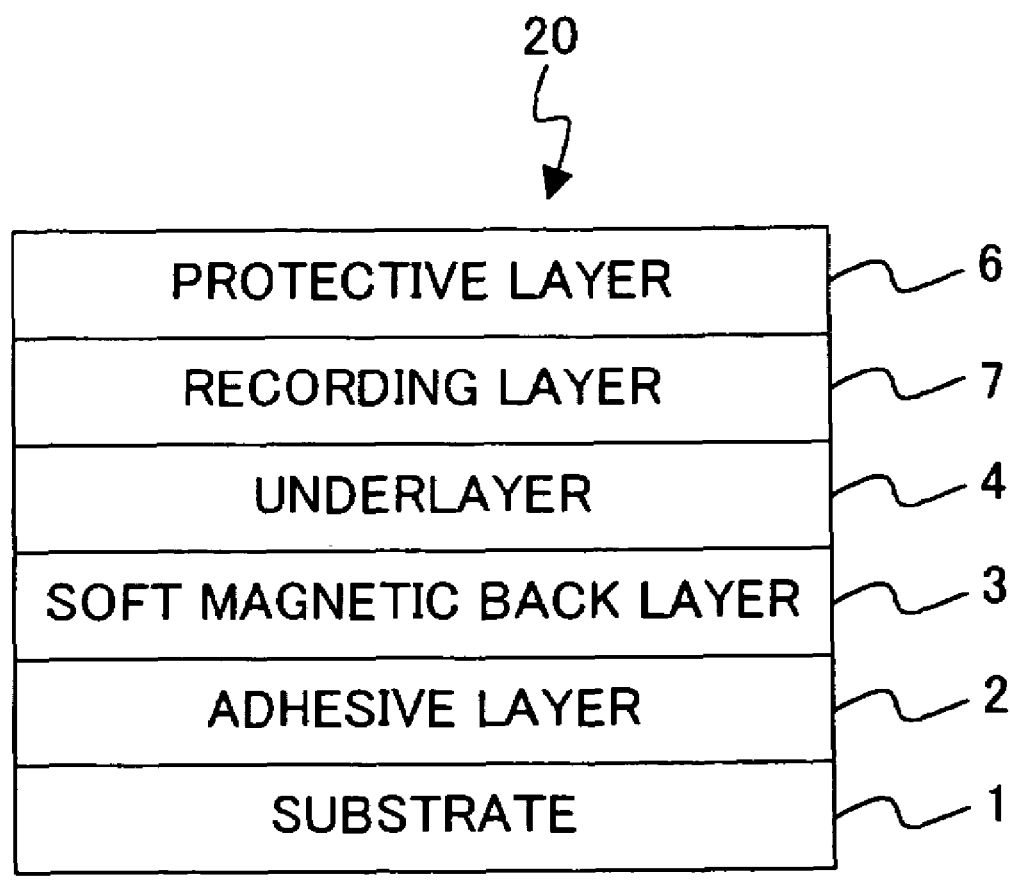
FIG. 2 shows a schematic sectional view illustrating a magnetic disk manufactured in Comparative Example 1.

FIG. 2 shows a schematic sectional view illustrating a magnetic disk manufactured in Example 2. As shown in FIG. 2, the magnetic disk 20 manufactured in Comparative Example 2 has such a structure that an adhesive layer 2, a soft magnetic back layer 3, an underlayer 4, a recording layer 7, and a protective layer 6 are successively stacked on a substrate 1. That is, in Comparative Example 2, the recording layer 5 was formed as a single layer. An explanation will be made below about a method for manufacturing the magnetic disk 20 prepared in Comparative Example 2.

At first, a disk-shaped glass substrate having a diameter of 2.5 inches (6.5 cm) was used for the substrate 1. A Ti film was formed as the adhesive layer 2 on the substrate 1 by means of the DC sputtering. As for the sputtering condition, the gas pressure was 0.28 Pa and the input electric power was 500 W. Ti was used for the target. The film thickness of the adhesive layer 2 was 5 nm.

Subsequently, a CoTaZr film was formed as the soft magnetic back layer 3 on the adhesive layer 2 by means of the DC sputtering. As for the sputtering condition, the gas pressure was 0.28 Pa and the input electric power was 500

W. The composition of the target was $Co_{88}Ta_{10}Zr_2$ (at. %). The film thickness of the soft magnetic back layer 3 was 200 nm.

Subsequently, a CoCrRu film was formed as the underlayer 4 on the soft magnetic back layer 3 by means of the DC sputtering. As for the sputtering condition, the gas pressure was 0.28 Pa and the input electric power was 500 W. The composition of the target was $Co_{55}Cr_{25}Ru_{20}$ (at. %). The film thickness of the underlayer 4 was 10 nm.

Further, a $CoPtCr$—$SiO_2$ alloy magnetic film was formed as the recording layer 7 on the underlayer 4 by means of the RF sputtering. As for the sputtering condition, the gas pressure was 4.2 Pa and the input electric power was 400 W. The composition of the target was $Co_{70}Pt_{20}Cr_{10}$ (at. %)-$SiO_2$ ($CoPtCr:SiO_2$=88:12 mol %) in the same manner as in the first recording layer 5a of the magnetic disk 10 manufactured in Example 1. The film thickness of the recording layer 7 was 15 nm.

Finally, an amorphous carbon film was formed as the protective layer 6 on the recording layer 7 by means of the DC sputtering. As for the sputtering condition, the gas pressure was 0.20 Pa and the input electric power was 300 W. The film thickness of the protective layer 6 was 3 nm.

COMPARATIVE EXAMPLE 3

In Comparative Example 3, a magnetic disk was manufactured in the same manner as in Comparative Example 2 except that a recording layer 7 corresponding to the recording layer 7 of Comparative Example 2 was formed by using a target having a composition of $Co_{70}Pt_{20}Cr_{10}$ (at. %)-$SiO_2$ ($CoPtCr:SiO_2$=95:5 mol %).

Magnetization Characteristics

Figure 3:
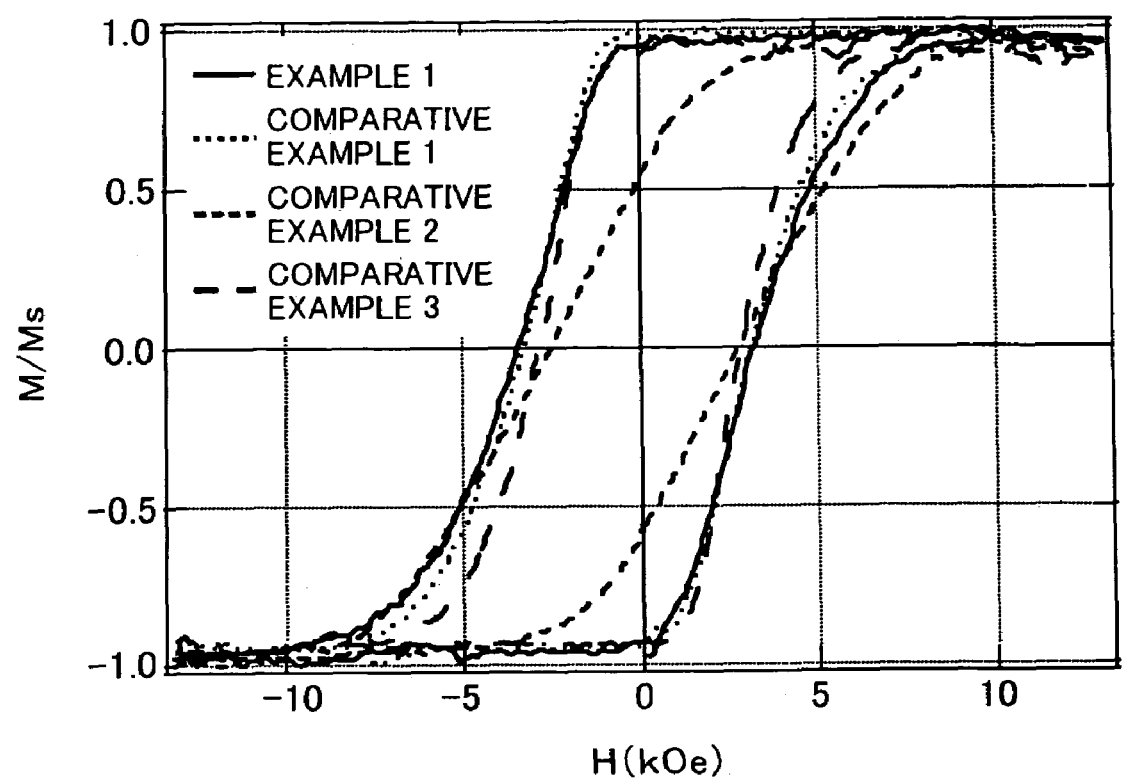
FIG. 3 shows magnetic characteristics in a direction perpendicular to each of the film surfaces of the magnetic disks manufactured in Example 1 and Comparative Examples 1 to 3.

Magnetization characteristics were measured in the direction perpendicular to the film surface for the magnetic disks manufactured in Example 1 and Comparative Examples 1 to 3 described above. FIG. 3 shows magnetization curves obtained from the respective magnetic disks. As a result of the measurement, the coercivity was 3.5 kOe, the squareness ratio was 1, and the magnetic field of the reverse magnetic domain generation was −0.7 kOe in the case of the magnetic disk of Example 1, in which the most appropriate magnetostatic characteristics were obtained of those of the magnetic disks manufactured in Example 1 and Comparative Examples 1 to 3 as described later on.

In the case of the magnetic disk of Comparative Example 1, the obtained values of the coercivity and the squareness ratio were equivalent to the values obtained for the magnetic disk of Example 1. However, as shown in FIG. 3, the slope $\alpha$ of the magnetization curve (slope of the hysteresis loop in the vicinity of the coercivity) of the magnetic disk manufactured in Comparative Example 1 ($\alpha$=2.5) was larger than that ($\alpha$=2.2) of the magnetic disk manufactured in Example 1. It is preferable that the slope $\alpha$ of the magnetization curve is smaller in view of the following reason. That is, the slope $\alpha$ of the magnetization curve is a parameter representing the magnetic interaction between the crystal grains of which the recording layer is formed, and as the slope $\alpha$ of the magnetization curve is closer to 1 (one), the magnetic interaction between the crystal grains becomes smaller, so that the magnetization of each crystal grain in the recording layer can independently reverse. Therefore, it is noted that fine and minute magnetic-domains can be realized to reduce the medium noise by controlling the slope $\alpha$ to be closer to 1.

In the case of the magnetic disk of Comparative Example 2, the slope $\alpha$ of the magnetization curve was 1.8 which was the smallest value of those of the magnetic disks manufactured in Example 1 and Comparative Examples 1 to 3 as shown in FIG. 3. However, in the case of the magnetic disk of Comparative Example 2, the squareness ratio was 0.6 which was smaller than the squareness ratio of the magnetic disk of Example 1.

In the case of the magnetic disk of Comparative Example 3, the squareness ratio was 1, and the magnetic field of the reverse magnetic domain generation was −1.0 kOe as well, in which satisfactory characteristics were exhibited. However, the slope $\alpha$ of the magnetization curve of the magnetic disk of Comparative Example 3 was an extremely large value, i.e., 4.0, probably for the following reason. That is, it is considered that the magnetic interaction between the crystal grains was intensified in the magnetic disk of Comparative Example 3, because the oxide concentration of the recording layer formed of the single layer was low (5 mol %).

As clarified from the results described above, it has been revealed that the satisfactory magnetic characteristics are obtained for the magnetic disk like the magnetic disk manufactured in Example 1 in which the recording layer is composed of the plurality of magnetic layers (first and second recording layers in Example 1) having the different oxide concentrations, as compared with the magnetic disk in which the recording layer is formed of the single layer. Further, according to the comparison between Example 1 and Comparative Example 1, it has been revealed that the more excellent magnetostatic characteristics are obtained when the oxide concentration of the magnetic layer (first recording layer) disposed on the side of the underlayer is higher than the oxide concentration of the magnetic layer (second recording layer) disposed on the side opposite to the underlayer.

Recording and Reproduction Characteristics

Figure 4A:
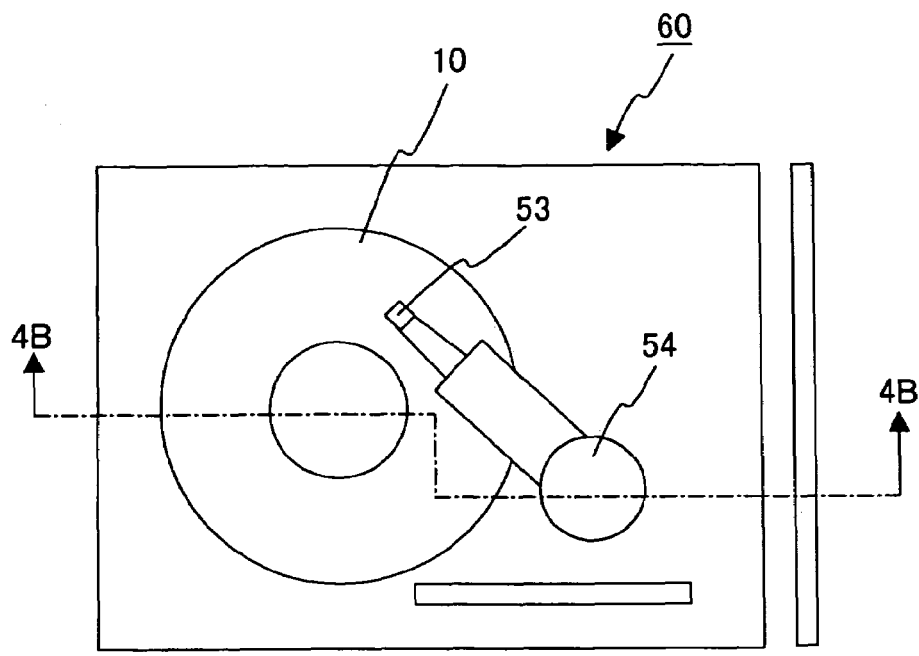
FIG. 4A shows a plan view.
Figure 4B:
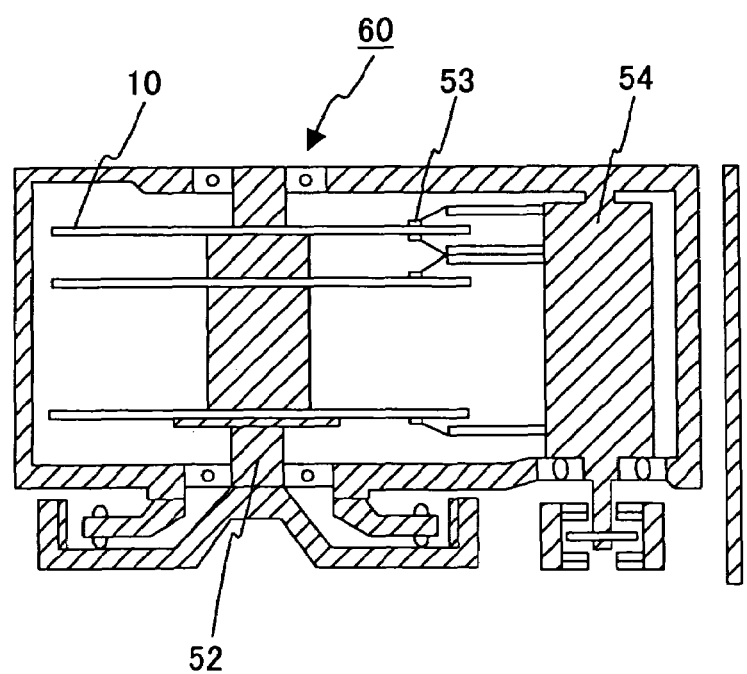
FIG. 4B shows a sectional view taken along a line 4B—4B shown in FIG. 4A.

Next, a lubricant was applied to have a thickness of 1 nm on the protective layer of each of the magnetic disks manufactured in Example 1 and Comparative Examples 1 to 3. After that, the magnetic disks were installed into a magnetic recording apparatus 60 shown in FIG. 4 respectively to evaluate the recording and reproduction characteristics. However, FIG. 4 shows a schematic view of the magnetic recording apparatus 60 installed with the magnetic disks 10 manufactured in Example 1 by way of example. FIG. 4A shows a plan view of the magnetic recording apparatus 60, and FIG. 4B shows a sectional view of the magnetic recording apparatus 60 taken along a broken line 4B—4B shown in FIG. 4A. As shown in FIG. 4B, the magnetic disks 10 are coaxially attached to a spindle 52 of a rotary driving system, and they are rotated by the spindle 52. The magnetic recording apparatus 60 is provided with a drive unit 54 for driving a magnetic head 53 relative to the magnetic disk 10.

When information was recorded on the magnetic disk 10 by using the magnetic recording apparatus 60 shown in FIG. 4, a thin film magnetic head, which was provided with a soft magnetic film having a high saturation magnetic flux density of 2.1 T, was used. When information was reproduced, a spin-valve type magnetic head having a giant magnetoresistance effect element was used. The thin film magnetic head for the recording and the spin-valve type magnetic head for the reproduction are integrated into one unit which is indicated as the magnetic head 53 in FIG. 4. The position of the integrated type magnetic head 53 is controlled by the magnetic head-driving system 54. The distance was maintained to be 5 nm between the magnetic head surface of the magnetic recording apparatus 60 and the surface of the magnetic disk.

When information is recorded by applying the magnetic field to the magnetic disk 10 by using the magnetic head 53 of the magnetic recording apparatus 60, then the magnetization, which is in the direction perpendicular to the film surface, is applied in the first recording layer 5a and the second recording layer 5b of the magnetic disk 10, and the magnetization, which is in the in-plane direction, is applied in the soft magnetic back layer 3. Accordingly, a magnetic circuit is constructed by the first recording layer 5a, the second recording layer 5b, the soft magnetic back layer 3, and the magnetic head 53 in cooperation.

The magnetic disks manufactured in Example 1 and Comparative Examples 1 to 3 were installed to the magnetic recording apparatus shown in FIG. 4 respectively to measure the recording and reproduction characteristics. In this measurement, the evaluation was made for the dependency on the linear recording density of the Slf/Nd ratio to serve as an index of the signal-to-noise ratio. However, Slf indicates the reproduction output obtained when a signal of a linear recording density of 20 kFCI is recorded, and Nd indicates the noise level at linear recording densities of 0, 200, 400, 600, and 800 kFCI. Obtained results are shown in FIG. 5.

Figure 5:
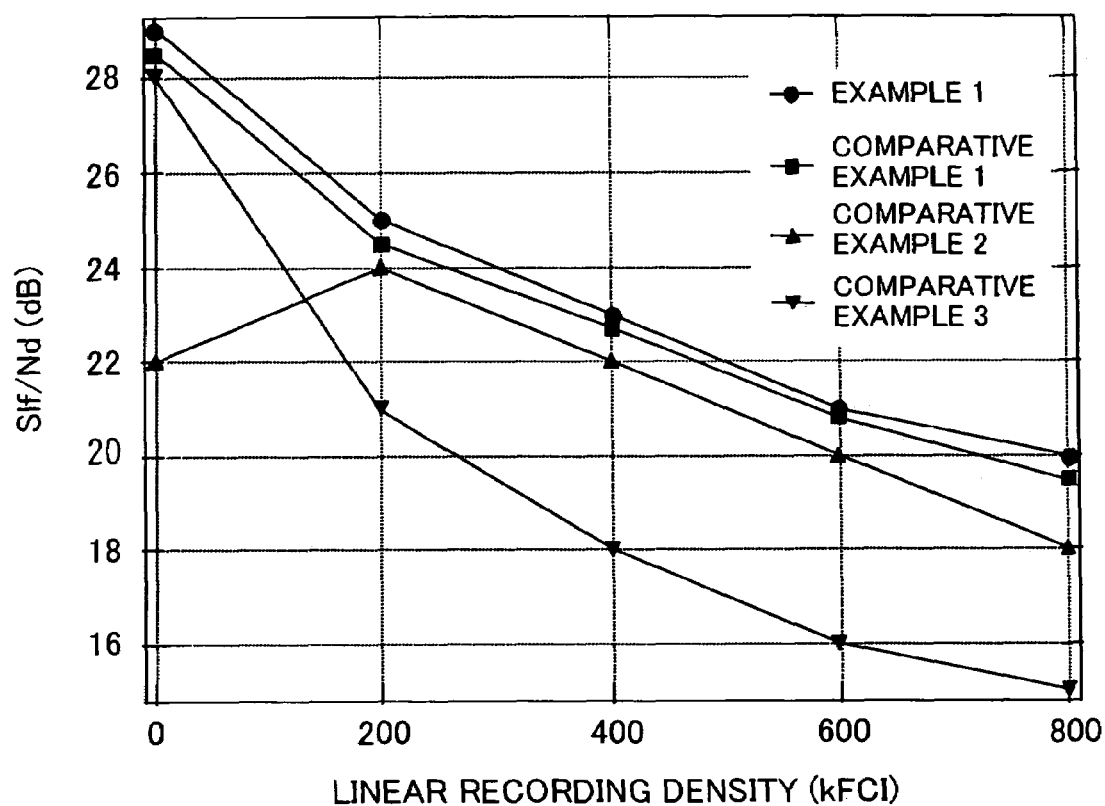
FIG. 5 shows the dependency on the linear recording density, of the Slf/Nd ratios of the magnetic disks manufactured in Example 1 and Comparative Examples 1 to 3.

As clarified from FIG. 5, the Slf/Nd ratio of the magnetic disk of Example 1 was larger than that of any one of the magnetic disks of Comparative Examples 1 to 3 in the range of the linear recording density measured in this experiment. Further, it was revealed that the Slf/Nd ratio of the magnetic disk of Example 1 was decreased as the linear recording density was increased, but the rate of the decrease is smaller than that of any one of the magnetic disks of Comparative Examples 1 to 3. That is, it was revealed that the magnetic disk of Example 1 exhibited the more excellent recording and reproduction characteristics than those of the magnetic disks of Comparative Examples 1 to 3 in the range of the linear recording density measured in this experiment.

As clarified from FIG. 5, it was revealed that the Slf/Nd ratio of the magnetic disk of Comparative Example 1 was slightly lower than that of the magnetic disk of Example 1 in the measured range of the linear recording density. Further, according to the results shown in FIG. 5, the following fact has been revealed. That is, in the high recording density area (600 to 800 kFCI) which is to be important for the perpendicular magnetic recording system as the next generation recording system, the more satisfactory recording and reproduction characteristics are obtained on the magnetic disk as manufactured in Example 1 in which the oxide concentration of the magnetic layer (first recording layer) disposed on the side of the underlayer in the recording layer is higher than the oxide concentration of the magnetic layer (second recording layer) disposed on the side opposite to the underlayer. It is considered that this fact results from the following cause.

As indicated by the magnetization curve shown in FIG. 3, the slope α of the magnetization curve of the magnetic recording medium of Comparative Example 1 (slope of the hysteresis loop in the vicinity of the coercivity) is larger than that of the magnetic disk of Example 1. It is considered that the difference in the slope α of the magnetization curve results from the fact that the magnetic interaction between the crystal grains in the recording layer is stronger in the magnetic disk of Comparative Example 1 than in the magnetic disk of Example 1. When the magnetic interaction between the crystal grains in the recording layer is intensified, the rotation of magnetization in the magnetization reversal process does not become ideal. Therefore, the slope α of the magnetization curve becomes larger. As a result, the slope α of the magnetization curve is increased. It is considered that the difference in the intensity of the magnetic interaction between the crystal grains in the recording layer appears as the difference in noise in the high linear recording density area, and the Slf/Nd ratio of the magnetic disk of Comparative Example 1 is lower than that of the magnetic disk of Example 1.

In the case of the magnetic disk of Comparative Example 2, as clarified from the result of the measurement of the magnetization characteristics described above, the Slf/Nd ratio is deteriorated in the low linear recording density area (0 to 200 kFCI in FIG. 5), because the squareness ratio is unsatisfactory as compared with the magnetic disk of Example 1. However, as clarified from FIG. 5, the magnetic disk of Comparative Example 2 exhibited such a specific behavior that the Slf/Nd ratio was once improved when the linear recording density was increased to some extent, probably for the following reason. That is, it is considered that the reverse magnetic domains are generated in the bits of the recording layer in the low recording density area and the noise is increased, because the squareness ratio of the magnetization curve is unsatisfactory in the case of the magnetic disk of Comparative Example 2. However, the noise, which results from the reverse magnetic domains generated in the bits, may be also relatively reduced as the linear recording density is increased.

In the case of the magnetic disk of Comparative Example 3, as clarified from FIG. 5, the Slf/Nd ratio approaches the Slf/Nd ratio of the magnetic disk of Example 1 in the area in which the linear recording density is in the vicinity of about 0 kFCI, and it is possible to obtain the satisfactory Slf/Nd ratio. However, as clarified from FIG. 5, it was revealed that the Slf/Nd ratio was suddenly lowered as the linear recording density was increased, probably for the following reason. That is, it is considered that the magnetic interaction between the crystal grains in the recording layer is strong, and the unit of magnetization reversal is larger than that of the magnetic disk of Example 1, because the recording layer is formed by the single layer and the oxide concentration is low (5 mol %) in the case of the magnetic disk of Comparative Example 3. Therefore, the Slf/Nd ratio may be suddenly lowered as the linear recording density is increased.

EXAMPLE 2

As for a magnetic disk manufactured in Example 2, targets having an identical composition were used when a first recording layer 5a and a second recording layer 5b were formed by means of the sputtering. The first recording layer 5a was formed by means of the RF sputtering method, and the second recording layer 5b was formed by means of the DC sputtering method. The composition of the target was $Co_{70}Pt_{20}Cr_{10}$ (at. %)-$SiO_2$ ($CoPtCr:SiO_2$=88:12 mol %). As for the sputtering condition for the first recording layer 5a, the gas pressure was 4.2 Pa, the input electric power was 400 W, and the film thickness was 5 nm. On the other hand, as for the sputtering condition for the second recording layer 5b, the gas pressure was 4.2 Pa, the input electric power was 250 W, and the film thickness was 10 nm. The magnetic disk was manufactured in the same manner as in Example 1 except for the above.

The oxide concentrations of the first recording layer 5a and the second recording layer 5b of the magnetic disk manufactured in Example 2 were measured by means of the Auger electron spectroscopy analysis. Obtained results are shown in Table 1.

TABLE 1

|  | $SiO_2$ concentration [mol %] |
| --- | --- |
| First recording layer | 12.0 |
| Second recording layer | 7.0 |

As clarified from Table 1, the following fact was revealed. That is, the oxide concentration of the first recording layer 5a formed by the RF sputtering method had the same value as that of the oxide concentration of the target. On the contrary, the oxide concentration of the second recording layer 5b formed by the DC sputtering method was lower than the oxide concentration of the target, probably for the following reason. That is, it is considered that the conductive portion (metal portion) in the target is preferentially subjected to the sputtering when the DC sputtering method is used as compared with when the RF sputtering method is used. According to the results shown in Table 1, it has been revealed that the oxide concentration to be contained in each of the recording layers can be changed by changing the sputtering method even when the targets having the identical composition are used when the first recording layer 5a and the second recording layer 5b are formed by means of the sputtering. The oxide concentration of the second recording layer 5b to be formed by the DC sputtering method can be appropriately adjusted by changing the input electric power during the film forming. Therefore, in the case of the method for producing the magnetic disk of Example 2, it is unnecessary to prepare a plurality types of sputtering targets having different oxide concentrations when the recording layers are formed.

Figure 6:
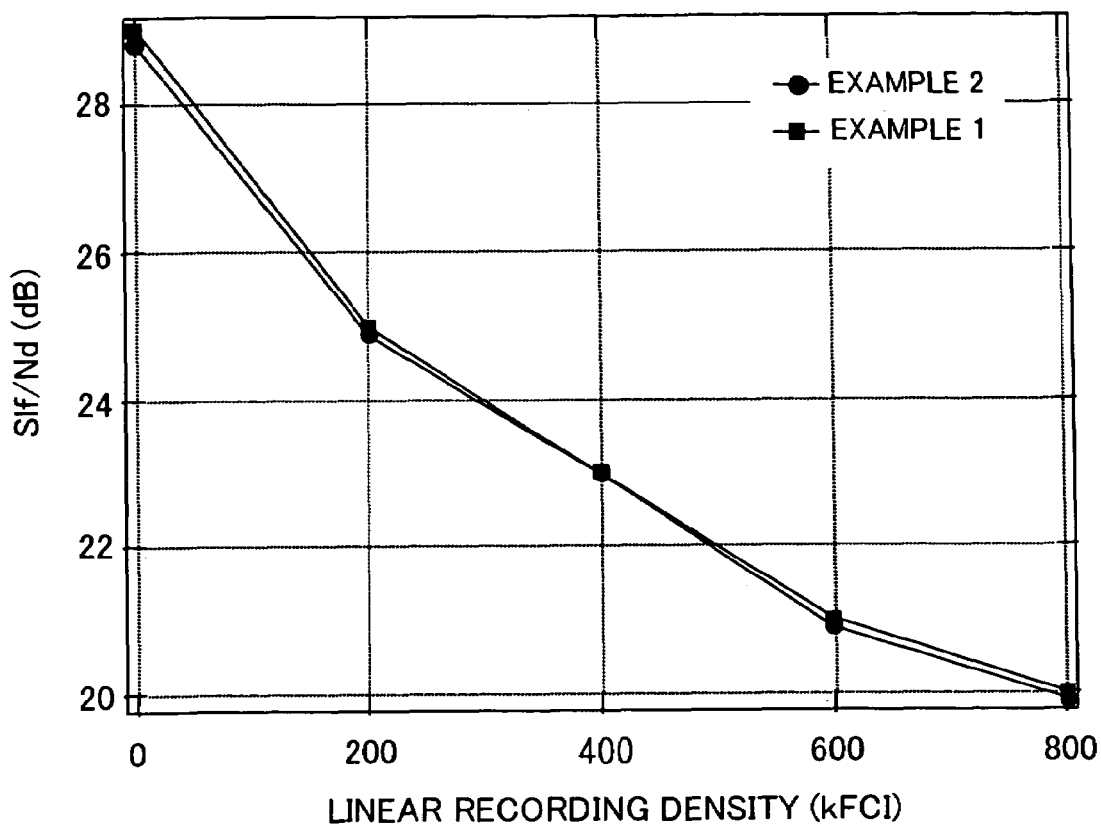
FIG. 6 shows the dependency on the linear recording density, of the Slf/Nd ratios of the magnetic disks manufactured in Examples 1 and 2.

A lubricant was also applied to have a thickness of 1 nm on the protective layer for the magnetic disk manufactured in Example 2 in the same manner as in Example 1. After that, the magnetic disks were installed into the magnetic recording apparatus 60 shown in FIG. 4 to evaluate the recording and reproduction characteristics. In this procedure, the dependency on the linear recording density of the Slf/Nd ratio was measured in the same manner as in Example 1. An obtained result is shown in FIG. 6. For the purpose of comparison, the result of Example 1 is also shown in FIG. 6. As clarified from FIG. 6, it has been revealed that approximately the same recording and reproduction characteristic as that of the result of the measurement performed in Example 1 is obtained for the dependency on the linear recording density of the Slf/Nd ratio of the magnetic disk manufactured in Example 2.

EXAMPLE 3

Figure 7:
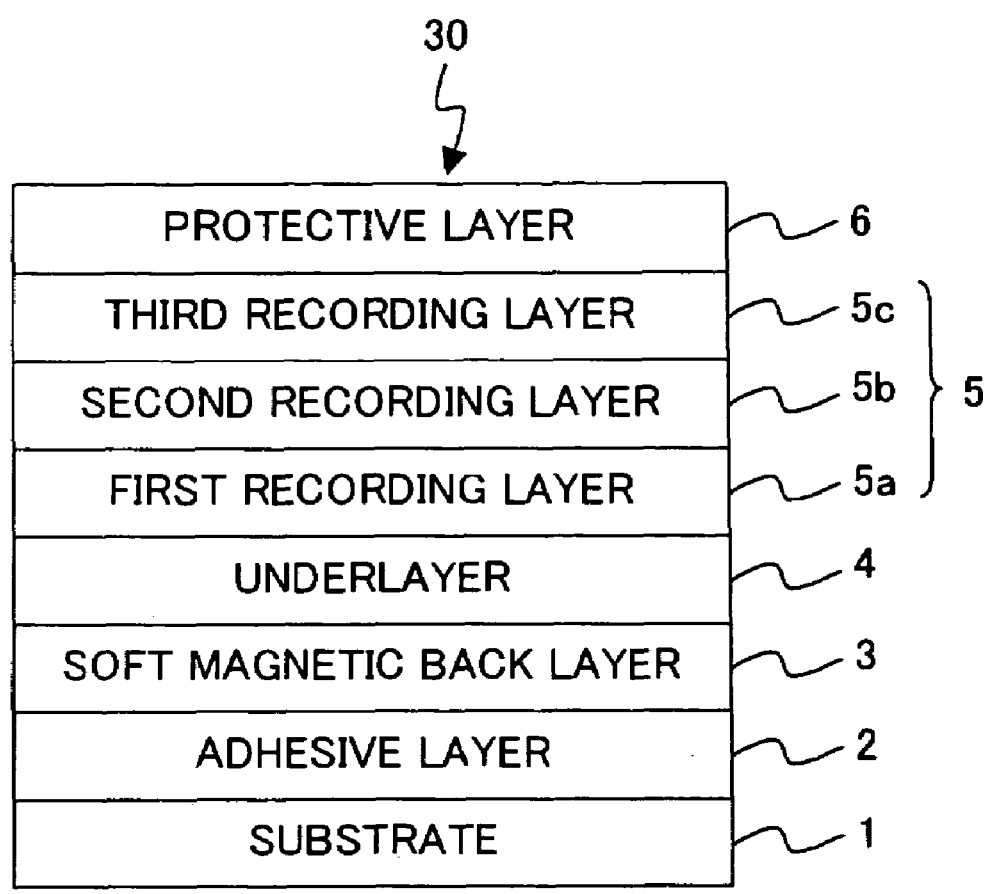
FIG. 7 shows a schematic sectional view illustrating a magnetic disk manufactured in Example 3.

FIG. 7 shows a schematic sectional view illustrating a magnetic disk manufactured in Example 3. As shown in FIG. 7, the magnetic disk 30 manufactured in Example 3 has such a structure that an adhesive layer 2, a soft magnetic back layer 3, an underlayer 4, a first recording layer 5a, a second recording layer 5b, a third recording layer 5c, and a protective layer 6 are successively stacked on a substrate 1. That is, in Example 3, a three-layered structure was formed to construct a recording layer 5. An explanation will be made below about a method for manufacturing the magnetic disk 30 prepared in Example 3.

At first, a disk-shaped glass substrate having a diameter of 2.5 inches (6.5 cm) was used for the substrate 1. A Ti film was formed as the adhesive layer 2 on the substrate 1 by means of the DC sputtering. As for the sputtering condition, the gas pressure was 0.28 Pa and the input electric power was 500 W. Ti was used for the target. The film thickness of the adhesive layer 2 was 5 nm.

Subsequently, a CoTaZr film was formed as the soft magnetic back layer 3 on the adhesive layer 2 by means of the DC sputtering. As for the sputtering condition, the gas pressure was 0.28 Pa and the input electric power was 500 W. The composition of the target was $Co_{88}Ta_{10}Zr_2$ (at. %). The film thickness of the soft magnetic back layer 3 was 200 nm.

Subsequently, a CoCrRu film was formed as the underlayer 4 on the soft magnetic back layer 3 by means of the DC sputtering. As for the sputtering condition, the gas pressure was 0.28 Pa and the input electric power was 500 W. The composition of the target was $Co_{55}Cr_{25}Ru_{20}$ (at. %). The film thickness of the underlayer 4 was 10 nm.

Further, a CoPtCr—$SiO_2$ alloy magnetic film was formed as the first recording layer 5a on the underlayer 4 by means of the RF sputtering. As for the sputtering condition, the gas pressure was 4.2 Pa and the input electric power was 400 W. The composition of the target was $Co_{70}Pt_{20}Cr_{10}$ (at. %)-$SiO_2$ (CoPtCr:$SiO_2$=88:12 mol %). The film thickness of the first recording layer 5a was 5 nm.

Subsequently, a CoPtCr—$SiO_2$ alloy magnetic film was formed as the second recording layer 5b on the first recording layer 5a by means of the RF sputtering. As for the sputtering condition, the gas pressure was 4.2 Pa and the input electric power was 400 W. The composition of the target was $Co_{70}Pt_{20}Cr_{10}$ (at. %)-$SiO_2$ (CoPtCr:$SiO_2$=92:8 mol %). The film thickness of the second recording layer 5b was 5 nm.

Subsequently, a CoPtCr—$SiO_2$ alloy magnetic film was formed as the third recording layer 5c on the second recording layer 5b by means of the RF sputtering. As for the sputtering condition, the gas pressure was 4.2 Pa and the input electric power was 400 W. The composition of the target was $Co_{70}Pt_{20}Cr_{10}$ (at. %)-$SiO_2$ (CoPtCr:$SiO_2$=95:5 mol %). The film thickness of the third recording layer 5c was 5 nm.

Finally, an amorphous carbon film was formed as the protective layer 6 on the third recording layer 5c by means of the DC sputtering. As for the sputtering condition, the gas pressure was 0.20 Pa and the input electric power was 300 W. The film thickness of the protective layer 6 was 3 nm.

Figure 8:
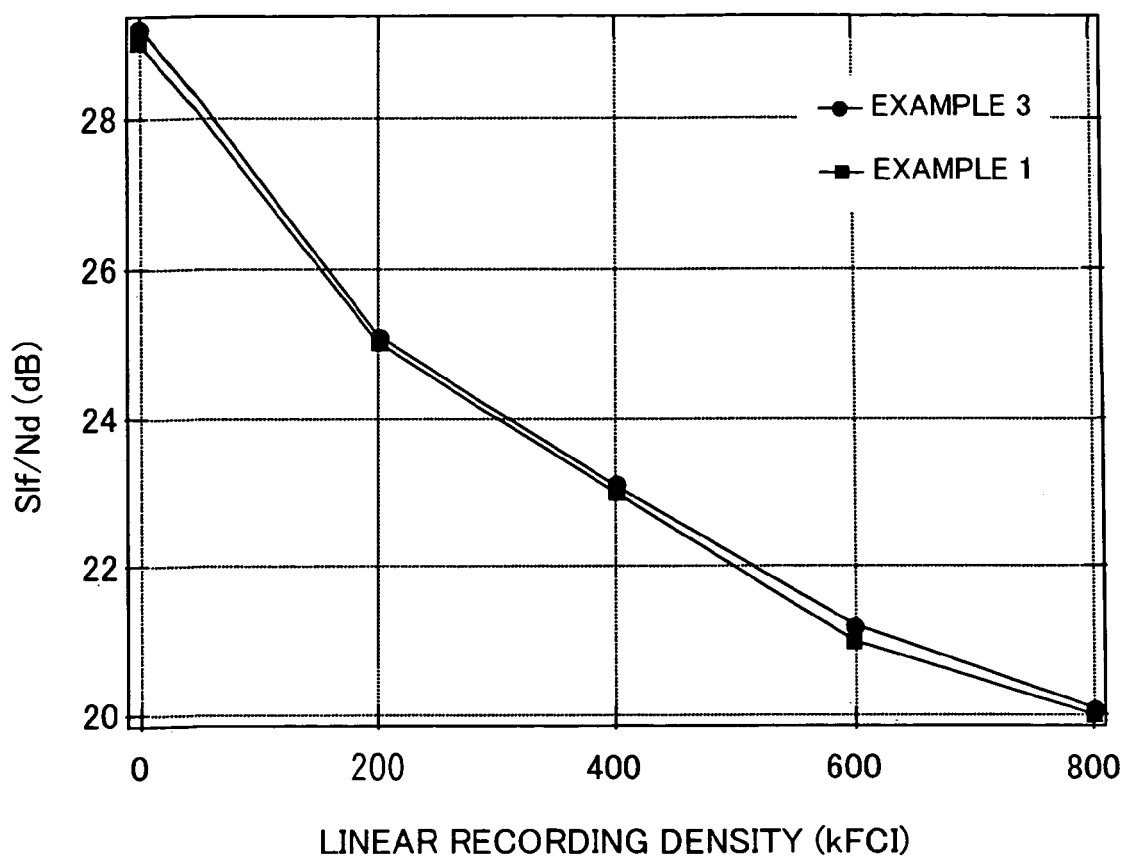
FIG. 8 shows the dependency on the linear recording density, of the Slf/Nd ratios of the magnetic disks manufactured in Examples 1 and 3.

A lubricant was also applied to have a thickness of 1 nm on the protective layer for the magnetic disk manufactured in Example 3 in the same manner as in Example 1. After that, the magnetic disks were installed into the magnetic recording apparatus 60 shown in FIG. 4 to evaluate the recording and reproduction characteristics. In this case, the dependency on the linear recording density of the Slf/Nd ratio was measured in the same manner as in Example 1. An obtained result is shown in FIG. 8. For the purpose of comparison, the result of Example 1 is also shown in FIG. 8.

As clarified from FIG. 8, it was revealed that the dependency on the linear recording density of the Slf/Nd ratio of the magnetic disk manufactured in Example 3 was slightly improved as compared with the result of the measurement performed in Example 1. That is, it has been revealed that the recording and reproduction characteristic is improved a little when the recording layer has the three-layered structure and the respective layers are formed so that the oxide concentrations are increased in the order starting from those disposed on the side of the underlayer like the magnetic disk manufactured in Example 3, as compared with the magnetic disk provided with the recording layer having the two-layered structure as described in Example 1. According to this result, it is expected that the recording and reproduction characteristic may be further improved when the recording layer is allowed to have multiple layers of a number larger than three and the respective layers are formed so that the oxide concentrations are increased in the order starting from those disposed on the side of the underlayer.

EXAMPLE 4

In Example 4, MgO was used in place of $SiO_2$ as the oxide to be added to the recording layer. A magnetic disk was manufactured in the same manner as in Example 1 except for the above. Therefore, the structure of the magnetic disk manufactured in Example 4 is the same as the structure shown in FIG. 1. A first recording layer and a second recording layer of the magnetic disk manufactured in Example 4 were formed in accordance with the following method.

A CoPtCr—MgO alloy magnetic film was formed as the first recording layer 5a on the underlayer 4 by means of the RF sputtering. As for the sputtering condition, the gas pressure was 4.2 Pa and the input electric power was 400 W. The composition of the target was $Co_{70}Pt_{20}Cr_{10}$ (at. %)-MgO (CoPtCr:MgO=88:12 mol %). The film thickness of the first recording layer 5a was 5 nm.

Subsequently, a CoPtCr—MgO alloy magnetic film was formed as the second recording layer 5b on the first recording layer 5a by means of the RF sputtering. As for the sputtering condition, the gas pressure was 4.2 Pa and the input electric power was 400 W. The composition of the target was $Co_{70}Pt_{20}Cr_{10}$ (at. %)-MgO (CoPtCr:MgO=95:5 mol %). The film thickness of the second recording layer 5b was 10 nm.

A lubricant was also applied to have a thickness of 1 nm on the protective layer for the magnetic disk manufactured in Example 4 in the same manner as in Example 1. After that, the magnetic disks were installed into the magnetic recording apparatus 60 shown in FIG. 4 to evaluate the recording and reproduction characteristics. In this case, the dependency on the linear recording density of the Slf/Nd ratio was measured in the same manner as in Example 1. Obtained results are shown in Table 2. For the purpose of comparison, the results of Example 1 and Comparative Examples 2 and 3 with the recording layers of the single layer structure are also depicted in Table 2.

TABLE 2

| Linear recording density | Slf/Nd [dB] | | | |
| --- | --- | --- | --- | --- |
|  | Example 4 | Example 1 | Comparative Example 2 | Comparative Example 3 |
| 0 kFCI | 29.0 | 29.0 | 22.0 | 28.0 |
| 400 kFCI | 22.3 | 23.0 | 22.0 | 18.0 |
| 800 kFCI | 19.0 | 20.0 | 18.0 | 15.0 |

As clarified from Table 2, it was revealed that the Slf/Nd ratio of the magnetic disk manufactured in Example 4 was further improved in the measured range of the linear recording density as compared with the magnetic disks of Comparative Examples 2 and 3 with the recording layers formed by the single layers. Further, approximately the same value as that obtained in Example 1 was obtained at the low linear recording density for the Slf/Nd ratio of the magnetic disk manufactured in Example 4. However, it was revealed that the value of the Slf/Nd ratio of the magnetic disk of Example 4 was slightly lowered as compared with the value of the magnetic disk of Example 1 as the linear recording density was increased. This situation was considered to occur due to the following cause.

In order to investigate the difference between the magnetic disks of Example 4 and Example 1, a planar image of the recording layer was observed by using a transmission electron microscope (TEM). As a result, the following fact was revealed. That is, the average crystal grain diameter in the recording layer of Example 1 was 7 nm, while the average crystal grain diameter in the recording layer of Example 4 was slightly increased, i.e., 8.5 nm. It is considered that the difference in the grain diameter appears as the difference in noise in the bit transition area during the high density recording, and the recording and reproduction characteristics of the magnetic disk of Example 4 in the high recording density area were slightly deteriorated as compared with the magnetic disk of Example 1. According to the result as described above, it has been revealed that $SiO_2$ is more preferably used as the oxide to be contained in the recording layer as compared with MgO, because the crystal grain diameter becomes further fine and minute.

Examples 1 to 4 described above are illustrative of the case of the formation based on the use of the oxide-containing CoPtCr alloy magnetic film as the recording layer of the magnetic disk. However, the present invention is not limited thereto. It is enough that the oxide-containing CoPtCr alloy magnetic film is crystalline, having the structure formed of the alloy mainly composed of Co in the crystal grains while containing the oxide between the crystal grains. The Co alloy, which is crystalline, may include elements such as Ta, Nb, Ti, Si, B, Pd, V, Mg, and Gd or any combination thereof other than Cr and Pt provided that the hexagonal closest-packed structure is formed.

Examples 1 to 4 described above are illustrative of the case of the use of the glass as the material for the substrate of the magnetic disk. However, the present invention is not limited thereto. The substrate material may be appropriately changed depending on, for example, the way of use. It is also allowable to use, for example, resin or plastic such as polycarbonate or aluminum.

Examples 1 to 4 described above are illustrative of the use of the case in which the CoTaZr film is provided as the soft magnetic back layer of the magnetic disk. However, the present invention is not limited thereto. The CoTaZr film is most preferable as the soft magnetic back layer. However, other than the above, it is also allowable to use, for example, FeTaC, FeTaN, FeAlSi, FeC, CoB, CoTaNb, NiFe, or a stacked or laminated film composed of a soft magnetic film thereof and a C film.

Examples 1 to 4 described above are illustrative of the case in which the oxide concentration in the recording layer is adjusted by using the target containing the oxide mixed in the CoPtCr alloy when the oxide-containing CoPtCr alloy magnetic film is formed as the recording layer. However, the present invention is not limited thereto. The oxide concentration in the recording layer may be adjusted by performing the sputtering by using a mixed gas of an oxide and argon with respect to a target containing no oxide. Alternatively, the oxide concentration in the recording layer may be adjusted by performing the sputtering by using a mixed gas of an oxide and argon as the sputtering gas and using a target containing oxygen mixed in the CoPtCr alloy. It is most desirable to use the method in which the oxide concentration in the recording layer is adjusted by using the target containing the oxide mixed in the CoPtCr alloy, in view of the easiness of the adjustment of the oxide concentration.

Examples 1 to 4 described above are illustrative of the case in which the plurality of magnetic layers are stacked in the order starting from those having the high oxide concentrations from the side of the underlayer in relation to the plurality of magnetic layers for forming the recording layer. However, the present invention is not limited thereto. It is enough that the magnetic layer (lowermost layer) of the plurality of magnetic layers for constructing the recording layer, which is provided on the side nearest to the underlayer, has the highest oxide concentration in the recording layer. The relative increment or decrement of the oxide concentration concerning the other magnetic layers may be arbitrarily established. For example, as described in Example 3 (see FIG. 7), when the recording layer is formed by the three layers of the magnetic layers (first, second, and third recording layers), it is also allowable that a magnetic disk may be manufactured so that a relationship of A2<A3<A1 holds provided that A1, A2, and A3 represent the oxide concentrations of the first, second, and third recording layers respectively, in which the same or equivalent effect is obtained.

Examples 1 to 4 described above are illustrative of the magnetic disk provided with the underlayer and the recording layer stacked on the substrate. However, the present invention is not limited thereto. When the underlayer itself has a function to support the recording layer, it is unnecessary to provide the substrate in some cases.

According to the magnetic recording medium and the method for producing the same of the present invention, the recording layer, which is formed of the alloy magnetic material which is mainly composed of CoPtCr and contains the oxide, is formed on the underlayer. Further, the recording layer includes the two or more magnetic layers having the different oxide concentrations, and the recording layer is formed so that the oxide concentration is increased in the layer disposed nearer to the underlayer. Accordingly, it is possible to provide the magnetic recording medium based on the perpendicular magnetic recording system which has the high magnetostatic characteristics, which causes the low medium noise, and which is capable of performing the high density recording. Therefore, the magnetic recording medium of the present invention and the magnetic recording apparatus provided with the same are preferred as the magnetic recording medium and the magnetic recording apparatus for the higher recording density for the next generation.

What is claimed is:

1. A magnetic recording medium based on a perpendicular magnetic recording system, comprising:
   a substrate which is formed of a non-magnetic material;
   a soft magnetic back layer which is formed of a soft magnetic material and which is formed on the substrate;
   an underlayer which is formed on the soft magnetic back layer; and
   a recording layer which is formed of an alloy magnetic material mainly composed of CoPtCr and which is formed on the underlayer, the alloy magnetic material containing an oxide, wherein:
   the recording layer includes two or more magnetic layers having different oxide contents, and a magnetic layer, which is included in the two or more magnetic layers and which is provided on a side nearest to the underlayer, has the highest oxide content in the recording layer; and
   the recording layer having a c-axis that is oriented perpendicularly to the in-plane direction of the recording layer.

2. The magnetic recording medium according to claim 1, wherein the two or more magnetic layers are stacked in such an order that those having higher oxide contents are disposed on a side nearer to the underlayer.

3. The magnetic recording medium according to claim 1, wherein the recording layer is provided in contact with the underlayer.

4. The magnetic recording medium according to claim 1, wherein the oxide contents of the two or more magnetic layers are 5 to 20 mol %, respectively.

5. The magnetic recording medium according to claim 4, wherein the recording layer includes a first recording layer and a second recording layer, the first recording layer is arranged on a side of the underlayer, and the following relationship is established between an oxide content A1 in the first recording layer and an oxide content A2 in the second recording layer:

$$5 \text{ mol \%} \leq A2 < 12 \text{ mol \%} \leq A1 \leq 20 \text{ mol \%}.$$

6. The magnetic recording medium according to claim 1, wherein the oxide contained in the recording layer is an Si oxide.

7. The magnetic recording medium according to claim 1, wherein the recording layer has a thickness of 8 to 20 nm.

8. A method for producing a magnetic recording medium, comprising the steps of:
   forming a soft magnetic back layer on a substrate;
   forming an underlayer on the soft magnetic back layer; and
   forming a recording layer on the underlayer with an alloy magnetic material which is mainly composed of CoPtCr and contains an oxide, the recording layer having a c-axis that is oriented perpendicularly to the in-plane direction of the recording layer, wherein:
   the step of forming the recording layer includes forming the recording layer by two or more magnetic layers having different oxide contents, and the recording layer is formed so that a magnetic layer, which is included in the two or more magnetic layers and which is formed on a side nearest to the underlayer, has the highest oxide content in the recording layer.

9. The method for producing the magnetic recording medium according to claim 8, wherein the two or more magnetic layers are stacked in the step of forming the recording layer in such an order that those having higher oxide contents are disposed on a side nearer to the underlayer.

10. The method for producing the magnetic recording medium according to claim 8, wherein the recording layer is formed by a sputtering method in the step of forming the recording layer.

11. The method for producing the magnetic recording medium according to claim 10, wherein the two or more magnetic layers having the different oxide contents are formed by an RF sputtering method and a DC sputtering method with sputtering targets having an identical composition in the step of forming the recording layer.

12. The method for producing the magnetic recording medium according to claim 11, wherein the recording layer is formed by stacking a first recording layer and a second recording layer in this order on the underlayer by the sputtering method in the step of forming the recording layer, and wherein the sputtering targets having the identical composition are used to form the first recording layer by the RF sputtering method and form the second recording layer by the DC sputtering method.

13. A magnetic recording apparatus for recording and reproducing information on a magnetic recording medium, comprising the magnetic recording medium as defined in claim 1, a magnetic head which forms a magnetic circuit in cooperation with the recording layer and the soft magnetic back layer of the magnetic recording medium when the information is recorded on the magnetic recording medium, and a drive unit which drives the magnetic head relative to the magnetic recording medium.

* * * * *